W. C. EVANS.
SANITARY STALL.
APPLICATION FILED JULY 31, 1911.
1,032,747.
Patented July 16, 1912.
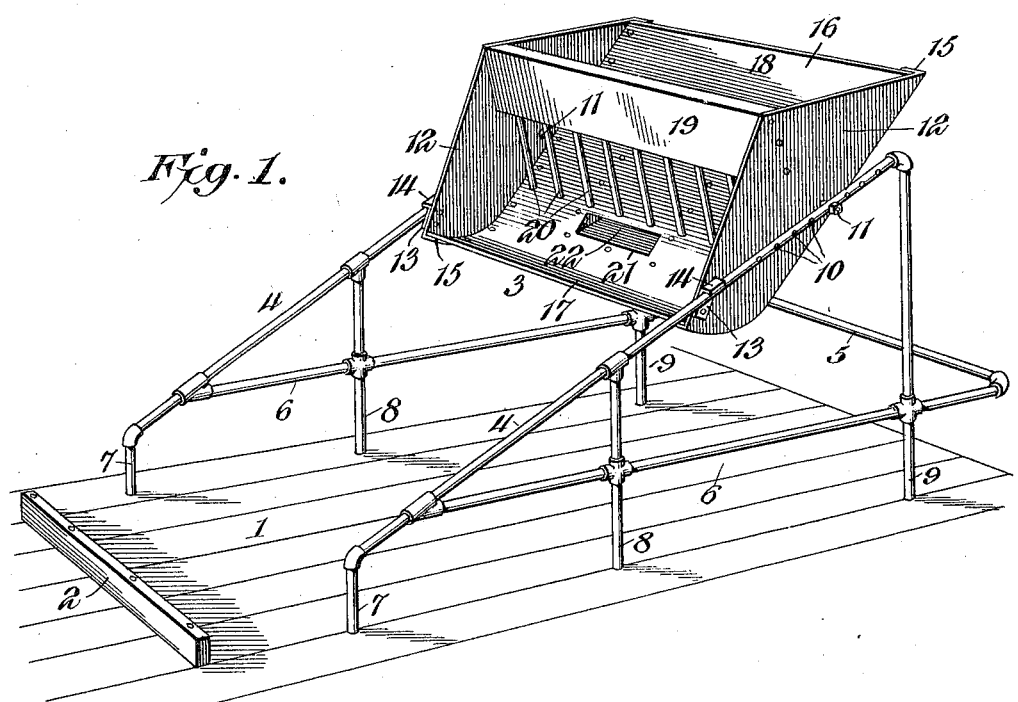
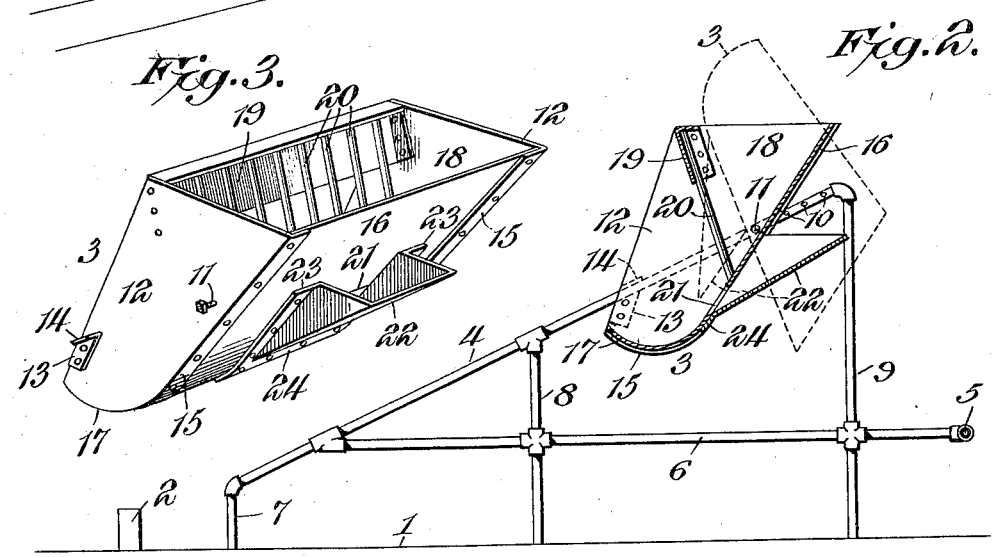
William C. Evans, Inventor,
Witnesses

UNITED STATES PATENT OFFICE.

WILLIAM C. EVANS, OF FORT COLLINS, COLORADO.

SANITARY STALL.

1,032,747. Specification of Letters Patent. Patented July 16, 1912.

Application filed July 31, 1911. Serial No. 641,538.

*To all whom it may concern:*

Be it known that I, WILLIAM C. EVANS, a citizen of the United States, residing at Fort Collins, in the county of Larimer and State of Colorado, have invented a new and useful Sanitary Stall, of which the following is a specification.

The invention relates to improvements in cattle stalls.

The object of the present invention is to improve the construction of stalls, and to provide a simple and comparatively inexpensive stall, designed for various animals, particularly cattle, and equipped with an adjustable manger, adapted to be readily arranged to vary the effective length of the stall to suit the size of an animal, and capable of permitting an animal to eat with ease and of affording sufficient space beneath it for an animal to hold up its head comfortably thereunder while lying down.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a perspective view of a stall, constructed in accordance with this invention. Fig. 2 is a longitudinal sectional view of the same. Fig. 3 is a detail perspective view of the manger.

Like numerals of reference designate corresponding parts in all the figures of the drawing.

In the accompanying drawing in which is illustrated the preferred embodiment of the invention, 1 designates the floor of the stall, designed to be constructed of any suitable material, such as cement, concrete, metal or wood, and provided at its rear portion with a stationary transverse strip 2 of wood, or other suitable material, extending entirely across the stall. The transverse dividing strip, which is preferably five or six inches in height so as not to interfere with the entrance and exit of the animal, is designed to be arranged in front of the hind legs of the animal, which is caused to stand in such position by an adjustable manger 3, mounted upon inclined supports 4 of the frame of the stall, and adapted to be moved upward and downward on the same to suit the size of the animal, whereby the stall may be varied in length without making either the transverse dividing strip or the frame of the stall adjustable. The frame of the stall, which is composed of spaced sides and a connecting front or head pinion 5, is preferably constructed of tubular metal, connected by couplings. The sides are composed of the inclined top members or supports 4, horizontal lower members 6, and vertical posts or uprights 7, 8 and 9. The lower members 6, which extend longitudinally of the stall, project beyond the posts 9 and are connected to the ends of the transverse end member 5. The number of posts and the connecting bars or members may, of course, be varied to provide a stall of the desired size and strength, and the lower ends of the posts are designed to be embedded in the floor 1.

The inclined supports 4 are provided at their upper portions with perforations 10, arranged at suitable intervals and receiving pivot bolts 11, which pierce the sides 12 of the manger and detachably connect the same to the sides of the stall, the adjustment of the manger being effected by placing the bolts in any of the perforations 10. When the manger is adjusted downwardly and rearwardly, the effective length of the stall is shortened and the manger is lowered to adapt the stall and the manger for a smaller animal, and when the manger is moved forwardly, it is elevated and the length of the stall is increased. The manger is arranged sufficiently high to afford ample room beneath it for a cow, or other animal to lie down, and as the animal will not lie across the dividing strip, it will step in advance of the same and lie upon the smooth floor and clean bedding. When the animal rises, it will be forced rearwardly by the manger and caused to step back over the dividing strip. The pivots 11 are arranged in advance of the center of gravity of the manger, which is supported in rear of the pivots by plates 13, secured to the outer faces of the sides of the manger and having their upper portions bent outwardly to form inclined lugs 14 to rest upon the inclined upper edges or supports of the sides of the stall, whereby the manger is firmly supported and well balanced. The pivots permit the manger to be swung over and inverted, as illustrated in dotted lines in Fig. 2 of the drawing, so that it may be thoroughly cleaned, when desired.

The manger, which may be constructed of any suitable material, is approximately triangular in side elevation, the sides 12 being tapered downwardly and inwardly and having inwardly extending flanges 15 at the rear and lower edges to which the back 16 and bottom 17 of the manger is riveted or otherwise secured. The back and bottom of the manger are preferably constructed of a single piece of material, as shown, especially when the manger is constructed of sheet metal, but when it is made of wood or a combination of wood and metal, the back and bottom may be constructed of separate pieces. The bottom is curved, as shown, to form a trough at the lower portion of the manger, and the flanges of the sides conform to the configuration of the bottom thereof.

The manger is provided with an inclined partition, coöperating with the sides and back of the manger to form an upper feed box 18, and consisting of an upper plate or piece 19 and spaced inclined rods 20, extending from the upper connecting piece 19 to the lower portion of the back 18 and suitably secured to the same. The rods are spaced apart a sufficient distance to permit the nose of a cow, or other animal to pass through them so as to afford access to hay, or other material placed in the feed box. The ends of the top connecting piece 19 are suitably secured to the sides of the manger.

The manger is provided in its back with an opening 21, located below the feed box 18 and communicating with a chute 22, constructed of sheet metal, or other suitable material and secured to the outer face of the back 16 of the manger, and adapted to permit fine feed to be readily introduced in the trough or bottom of the manger. When the chute 22 is constructed of sheet metal, the metal is bent to form an inclined outer portion and spaced sides, as clearly illustrated in Fig. 3 of the drawing. The chute is provided at the sides and bottom with attaching flanges 23 and 24, which are riveted or otherwise secured to the back of the manger.

The manger is not claimed in the present application, as it forms the subject-matter of a divisional application, filed Nov. 18, 1911, Serial No. 661,032.

Having thus fully described my invention, what I claim as new and desire to secure by Letters Patent, is:—

1. The combination of a stall provided at opposite sides with inclined supports, and a manger adjustable upwardly and downwardly on the supports.

2. The combination of a stall of a fixed length provided at opposite sides with inclined supports extending longitudinally of the stall, and a manger adjustable on the supports and adapted through such adjustment to be raised and lowered and to vary the effective length of the stall.

3. The combination of a stall of a fixed length provided at opposite sides with inclined supports extending longitudinally of the stall, a transverse dividing strip extending across the stall at the back thereof, and a manger adjustable along the inclined supports toward and from the dividing strip, whereby the manger is raised and lowered and the stall varied in length.

4. The combination of a stall provided at opposite sides with supports extending longitudinally of the stall, a manger pivoted at one side of its center of gravity to the supports and adapted to be tilted and inverted, and means mounted on the manger at the opposite side of its center of gravity and resting upon the said supports for holding the manger in position for use.

5. The combination of a stall provided at opposite sides with inclined supports having perforations arranged at intervals, a manger provided at one side of its center of gravity with pivots adapted to be arranged in any of the perforations, whereby the manger is adjustably and pivotally connected to the supports, and means projecting from the manger from the opposite side of the center of gravity and arranged to rest upon the said supports to hold the manger in position for use.

In testimony, that I claim the foregoing as my own, I have hereto affixed my signature in the presence of two witnesses.

WILLIAM C. EVANS.

Witnesses:
FRED W. STOW,
HOMER S. STEPHENS.